(12) United States Patent
Yu et al.

(10) Patent No.: US 11,827,114 B2
(45) Date of Patent: Nov. 28, 2023

(54) CHARGING ADAPTER AND CHARGING PROTECTION METHOD FOR ELECTRIC VEHICLE

(71) Applicant: Envision Energy CO., LTD, Jiangsu (CN)

(72) Inventors: Shize Yu, Jiangsu (CN); Yang Hu, Jiangsu (CN); Jianning Wang, Jiangsu (CN); Dexiang Guo, Jiangsu (CN)

(73) Assignee: Envision Energy CO., LTD, Jiangsu (CN)

( * ) Notice: Subject to any disclaimer, the term of this patent is extended or adjusted under 35 U.S.C. 154(b) by 402 days.

(21) Appl. No.: 17/417,382

(22) PCT Filed: Feb. 2, 2021

(86) PCT No.: PCT/CN2021/074763
§ 371 (c)(1),
(2) Date: Jun. 23, 2021

(87) PCT Pub. No.: WO2021/164536
PCT Pub. Date: Aug. 26, 2021

(65) Prior Publication Data
US 2022/0324341 A1 Oct. 13, 2022

(30) Foreign Application Priority Data
Feb. 18, 2020 (CN) .......................... 202010098411.4

(51) Int. Cl.
*B60L 53/16* (2019.01)
*B60L 53/60* (2019.01)
(Continued)

(52) U.S. Cl.
CPC ............... *B60L 53/16* (2019.02); *B60L 53/60* (2019.02); *H01R 13/111* (2013.01); *H01R 13/52* (2013.01);
(Continued)

(58) Field of Classification Search
CPC . B60L 53/16; B60L 53/60; B60L 3/04; H01R 13/111; H01R 13/52;
(Continued)

(56) References Cited

U.S. PATENT DOCUMENTS

| 2013/0196530 A1* | 8/2013 | Cheatham | H01R 43/26 439/502 |
| 2019/0135131 A1* | 5/2019 | Wenz | H01R 4/308 |
| 2020/0290468 A1* | 9/2020 | Moseke | H01R 13/6683 |

FOREIGN PATENT DOCUMENTS

| CN | 106956613 | 7/2017 | |
| CN | 108123341 A * | 6/2018 | ................ B60L 3/04 |

(Continued)

OTHER PUBLICATIONS

"International Search Report (Form PCT/ISA/210) of PCT/JP2017/003813," dated Apr. 29, 2021, pp. 1-4.

*Primary Examiner* — M Baye Diao
(74) *Attorney, Agent, or Firm* — JCIP GLOBAL INC.

(57) ABSTRACT

A charging adapter for electric vehicle includes a connecting mechanism, a control board, a charging plug, a charging socket, a locking pressure plate and an electromagnet iron. The control board monitors the temperature change inside the charging adapter and control the switch-off. The charging plug and the charging socket are installed at two ends of the connecting mechanism respectively. When used, the charging plug is connected to a charging socket of the electric vehicle, and the charging socket is connected to a charging gun to activate an operating control system of the electric vehicle. The locking pressure plate is installed in a surface of the end of connection mechanism near the charging plug. The electromagnet iron is installed inside the connection mechanism and located under the locking pres- (Continued)

sure plate, and is combined with the locking pressure plate to lock the charging adapter with the charging socket of the electric vehicle.

10 Claims, 2 Drawing Sheets

(51) Int. Cl.
    *H01R 13/11*     (2006.01)
    *H01R 13/52*     (2006.01)
    *H01R 13/62*     (2006.01)
    *H01R 31/06*     (2006.01)
    *H02J 7/00*     (2006.01)

(52) U.S. Cl.
    CPC ......... *H01R 13/6205* (2013.01); *H01R 31/06* (2013.01); *H02J 7/0042* (2013.01); *H01R 2201/26* (2013.01)

(58) Field of Classification Search
    CPC ............... H01R 13/6205; H01R 31/06; H01R 2201/26; H01R 13/6397; H01R 13/6275; H01R 13/6616; H01R 13/6683; H01R 31/065; H01R 13/639; H01R 13/6633; H01R 13/7137; H01R 43/26; H02J 7/0042
    USPC ........................................................ 320/109
    See application file for complete search history.

(56) References Cited

FOREIGN PATENT DOCUMENTS

| | | | | |
|---|---|---|---|---|
| CN | 109149255 | | 1/2019 | |
| CN | 209365929 | | 9/2019 | |
| CN | 209461720 U | * | 10/2019 | ......... Y02T 10/7072 |
| CN | 111180960 | | 5/2020 | |
| EP | 3471213 | | 4/2019 | |
| GB | 2597770 A | * | 2/2022 | .............. B60L 53/00 |
| WO | WO-2020229768 A1 | * | 11/2020 | .............. B60L 53/16 |
| WO | WO-2020233986 A1 | * | 11/2020 | .............. B60L 53/16 |

* cited by examiner

CHARGING ADAPTER AND CHARGING PROTECTION METHOD FOR ELECTRIC VEHICLE

CROSS-REFERENCE TO RELATED APPLICATION

This application is a 371 of international application of PCT application serial no. PCT/CN2021/074763, filed on Feb. 2, 2021, which claims the priority benefit of China application no. 202010098411.4, filed on Feb. 18, 2020. The entirety of each of the above mentioned patent applications is hereby incorporated by reference herein and made a part of this specification.

BACKGROUND

Technical Field

The disclosure relates to the technical field of electric vehicles, specifically, to the charging technology of electric vehicles.

Description of Related Art

With the development of the automotive industry, electric vehicles using clean energy have gradually replaced fuel vehicles with the advantages of zero emissions, high energy utilization and low noise. Current electric vehicles are usually charged by plugging the charging gun into the charging socket of the electric vehicle directly. If the standard used in the vehicle's charging socket does not match the national standard, an adapter is usually required. The current charging gun and adapter on the market do not have anti-theft function, and cannot interact with the vehicle signally, therefore, once the electric vehicle owner locks the car, it cannot be charged. In addition, the existing charging connection device is large in size, and inconvenient to carry, and does not have temperature overload protection, then it is impossible to avoid the damage to the vehicle due to the over high temperature of the charging socket.

SUMMARY

In view of some or all of the problems in the existing technology, an aspect of the present application provides a charging adapter for electric vehicles, comprising:
  a connecting mechanism, configured to mechanically connect an electric vehicle with a charging device;
  a control board, configured to monitor a temperature changes inside the charging adapter, and control a switch-off of the charging current of a charging connector;
  a charging plug, installed at one end of the connection mechanism, and connected to a charging socket of the electric vehicle when used, wherein CC1 and CC2 pins of the charging plug are connected in series with a 1K resistor, which is used to activate an operation control system of the electric vehicle, so that the electric vehicle enters a charging state;
  a charging socket, installed at the other end of the connection mechanism, and connected with a charging gun when used;
  a locking pressure plate, installed on a surface of the end of the connecting mechanism near the charging plug, to lock the charging adapter to the charging socket of the electric vehicle; and
  an electromagnetic iron, installed under the locking pressure plate, and electrically connected with the charging socket, to lock the charging adapter and the charging socket of an electric vehicle in conjunction with the locking pressure plate.

Further, the charging adapter further comprises a dust cap, which is installed on the charging socket. When the charging gun is not connected, the dust cover is closed, to block the charging socket, and prevent dust, rain, etc. entering into the charging device.

Further, the charging plug and charging socket comply with the requirements of the DC charging interface in the national standard GB/T20234.3-2015.

Further, the control board is equipped with a temperature sensor. When the temperature sensor detects a temperature above 60 degrees Celsius, the control board controls the CC1 pin of the charging socket to float, thereby interrupting charging.

Further, the locking pressure plate further comprises an unlock button, which is used to control the unlocking of the charging adapter and the charging socket of the electric vehicle.

Further, the electromagnet iron has an iron rod inside, when the electromagnet iron is energized, the iron rod ejects and stands up to the locking pressure plate, so that the unlock button cannot be pressed down, thereby realizing the locking of the charging adapter and the charging socket of the electric vehicle.

Another aspect of the present application provides a charging protection method for electric vehicles, including:
  locking the charging adapter and the electric vehicle, including:
  after the charging plug of the charging adapter is inserted into the charging socket of the electric vehicle, the locking pressure plate of the charging adapter is clamped to the charging socket of the electric vehicle; and
  after charging begins, the electromagnet iron is powered up to cause the iron rod inside the electromagnet iron to eject against the locking pressure plate; and
  monitoring temperature, after charging begins, the temperature sensor on the control board begins to operate, the internal temperature of the charging adapter is monitored in real-time, and once the temperature is above 60 degrees Celsius, then the control board controls the CC1 pin of the charging socket to float, thereby interrupting charging.

The present application provides a charging adapter for electric vehicles, which is small in size and easy to carry. It achieves the locking function by locking pressure plate and electromagnet iron, to ensure that the charging gun and charging adapter cannot be unplugged when charging. At the same time, the charging adapter can monitor the internal temperature changes, to ensure the safety and reliability of electric vehicles when charging. In addition, the charging adapter has the identification function of the on-board system, which allows the vehicle to be charged after locking.

BRIEF DESCRIPTION OF THE DRAWINGS

In order to further clarify the above and other advantages and features of the embodiments of the present invention, a more detailed description of the embodiments of the present invention will be given with reference to the accompanying drawings. It is understood that these drawings merely serve to depict typical embodiments of the present invention, and therefore should not be considered as limiting. In the draw

DESCRIPTION OF THE EMBODIMENTS

Figure 1:
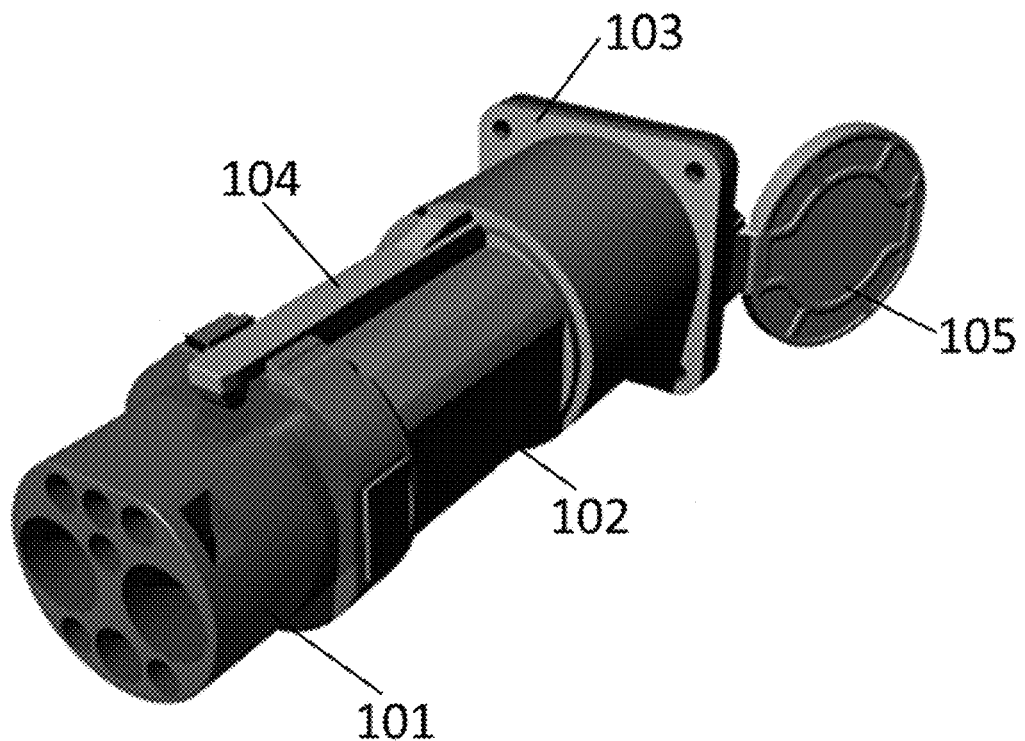
- FIG. 1 shows a schematic structural diagram of a charging adapter for electric vehicle in an embodiment of the present application.

In the following description, the present invention is described by reference to various embodiments. However, those skilled in the art will recognize that the various embodiments may be implemented without one or more specific details or with other alternative and/or additional methods, materials or components. In other cases, the public structure, material or operation is not shown or described in detail to avoid blurring the invention point of the present invention. Similarly, for the purpose of interpretation, a specific quantity, material and configuration are described in order to provide a comprehensive understanding of the embodiment of the present invention. However, the present invention is not limited to these specific details. In addition, it is understood that the various embodiments shown in the drawings are illustrative and are not necessarily drawn to scale.

In the present invention, a reference to "an embodiment" or "the embodiment" means that the particular feature, structure or characteristic described in conjunction with the embodiment is included in at least one embodiment of the present invention.

The wording "in one embodiment" in the present invention does not necessarily refer to the same embodiment.

It should be noted that the embodiment of the present invention describes the process steps in a specific order, however, this is only to illustrate the specific embodiment, rather than to limit the sequence of the steps. On the contrary, in the different embodiments of the present invention, the sequence of steps can be adjusted according to the adjustment of the process.

In the present application, electric vehicles cover electric vehicles, electric motorcycles, as well as electric bicycles and other means of electric transportation.

The present application provides a charging adapter and charging protection method for electric vehicles, which solve the problem that the electric vehicles cannot be charged when locked by the owner, and have advantages such as anti-theft, charging temperature protection, easy to carry and son on. The present application will be further explained below with reference to the drawings in conjunction with specific embodiments.

Figure 3:
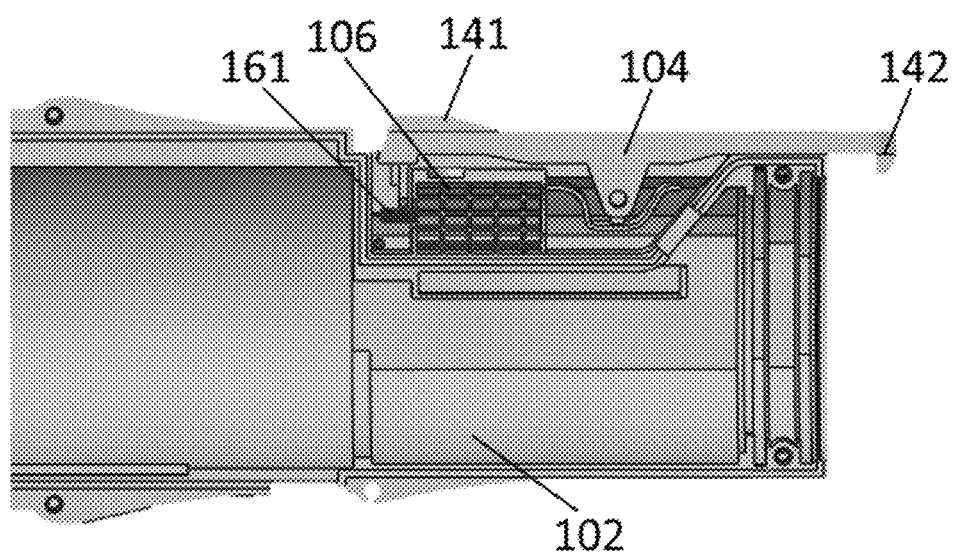
FIG. 3 shows a schematic cross-sectional view of the charging adapter for electric vehicles in an embodiment of the present application.

FIG. 1 shows a schematic structural diagram of the charging adapter for electric vehicle in an embodiment of the present application, and FIG. 3 shows a schematic cross-sectional view of the charging adapter for electric vehicle in an embodiment of the present application. As shown in FIG. 1 and FIG. 3, a charging adapter for electric vehicle includes a charging plug 101, a connection mechanism 102, a charging socket 103, a locking pressure plate 104, a dust cap 105, a control board (not shown in the figures) and an electromagnet iron 106.

The connection mechanism 102 is used for the mechanical connecting the electric vehicle and the charging device and holding a transmission wire for transmitting electrical energy.

The charging plug 101 is installed at one end of the connection mechanism 102 and connected with the transmission wire, which can be electrically connected to the charging socket of the electric vehicle. The charging plug 101 has one or more detection pins. In one embodiment of the present application, the CC1 and CC2 pins of the charging plug 101 are connected in series with a 1K resistor, respectively. When charging is required, the charging plug 101 is connected to the charging socket of the electric vehicle. At this time, the CC1 and CC2 pins produce a low-level signal, and the on-board system of the electric vehicle confirms that the charging gun has been inserted by reading the CC2 and/or CC1 signal, and then activates the on-board charging system, to achieve the charging action in the locking state. In another embodiment of the present application, the interface of the charging plug 101 is designed according to the requirements of the national standard GB/T20234.3-2015.

Figure 2:
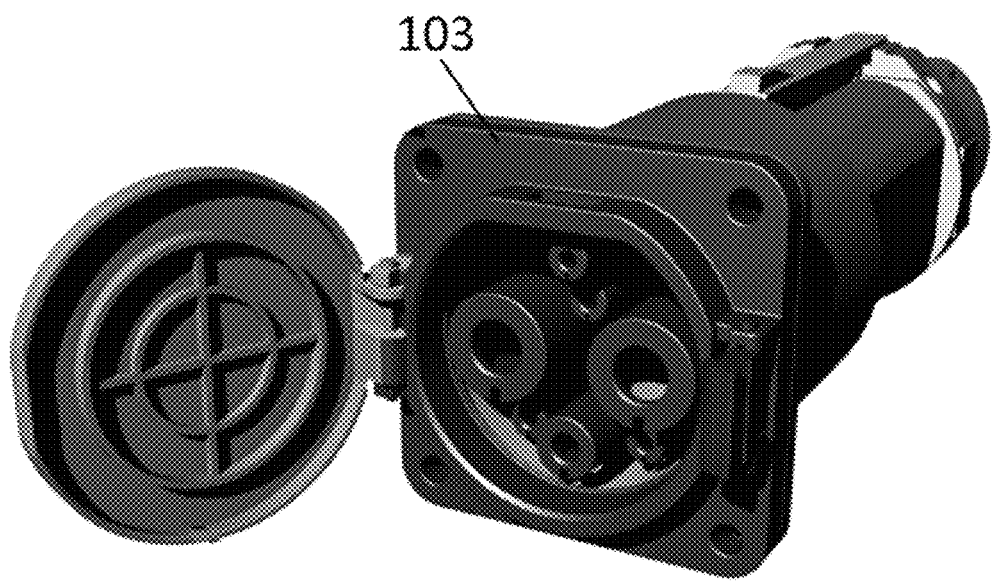
FIG. 2 shows a schematic structural diagram of a charging socket of the charging adapter for electric vehicle in an embodiment of the present application.

The charging socket 103 is installed at the other end of the connection mechanism 102 and connected with the transmission wire, which is capable of being electrically connected with the charging gun. When charging, the charging socket 103 is connected to the charging gun. In one embodiment of the present application, as shown in FIG. 2, the interface of the charging socket 103 is designed according to the requirements of the national standard GB/T20234.3-2015, and can be connected with a DC charging gun designed in accordance with the requirements of the national standard GB/T20234.3-2015.

As shown in FIG. 3, the locking pressure plate 104 is installed on the surface of the end of the connection mechanism 102 near the charging plug 101, and the electromagnet iron 106 is installed inside of the connection mechanism 102, located directly below the end of the locking pressure plate 104. In one embodiment of the present application, the locking pressure plate 104 is a warp structure, the end of which has an unlock button 141, and the head has a buckle 142. An iron rod 161 is inside of the electromagnetic iron. After inserting the charging adapter into the charging socket of the electric vehicle, the buckle 142 is clamped to the edge of the charging socket of the electric vehicle. After charging begins, the electromagnet iron 106 is powered up, and the iron rod 161 inside the electromagnet iron is ejected. The iron rod 161 after ejected is located directly below the unlock button 141 and close to the unlock button 141, so that the unlock button 141 cannot be pressed down, and the charging adapter and the charging socket of the electric vehicle are locked. When charging is complete, the electromagnet is powered off, and the iron rod 161 retracts the inside of the electromagnet iron 106. At this time, the unlock button 141 is pressed down, making the head of the locking pressure plate 104 tilt up, and the buckle is released, thereby the locking state is relieved, and the charging adapter can be pulled out.

The control board is electrically connected with the charging plug 101 and the charging socket 103, and the control board is equipped with a temperature sensor. When charging, the temperature sensor monitors the temperature inside the charging adapter in real time and controls the switch-off of the charging current according to the voltage of the detection pin. In one embodiment of the present application, once the temperature sensor detects that the temperature inside the charging adapter exceeds 60 degrees Celsius, the control board will control the CC1 of the charging socket 103 to float, so that the charging gun interrupts the connection signal, and thus interrupts the electrical conduction.

The dust cap 105 is installed on the outside of the charging socket 103. When the charging gun is not connected, the dust cap 105 is in a closed state to block the charging socket 103, to prevent dust, rain, etc. from entering into the charging adapter.

The process of charging an electric vehicle by using the charging adapter for an electric vehicle in some embodiments of the present application is as follows.

The owner holds the charging adapter, opens the dust cap of the charge socket of the electric vehicle, inserts the charging plug 101 of the charging adapter into the charging socket of the electric vehicle until the locking pressure plate 104 locks the charging adapter and the charging socket of the electric vehicle, at this time, the operation control system of the electric vehicle is activated through the CC1 and/or CC2 signal to make it enter into the charging state.

The operator holds a DC charging gun, opens the dust cap 105 of the charging adapter, then inserts the plug of the DC charging gun into the charging socket 103 of the charging adapter, until the locking device of the DC charging gun locks them and start charging, at this time, the iron rod 161 of the electromagnet iron ejects, to prevent the locking pressure plate 104 from being pressed down, and further lock the charging adapter and the charging socket of the electric vehicle.

During the charging process, the temperature sensor monitors the temperature inside the charging adapter in real time, and once the temperature sensor detects that the temperature inside the charging adapter exceeds 60 degrees Celsius, the control board will control the CC1 of the charging socket 103 to float, causing the charging gun to interrupt the connection signal, and thus interrupting the electrical conduction.

After charging, the operator presses the unlock button of the DC charging gun, unlocks the connection of the charging adapter to the DC charging gun, and pulls out the DC charging gun. The owner presses the unlock button 141 of the charging adapter, unlocks the connection of the charging adapter to the electric vehicle, and unplugs the charging adapter to complete the operation.

Although the embodiments of the present invention are described above, it should be understood that they are presented only as examples and not as limitations. It is obvious to the technical personnel in the relevant field that various combinations, variants and changes can be made without departing from the spirit and scope of the present invention. Therefore, the width and scope of the present invention disclosed herein shall not be limited by the sample embodiments disclosed above, but shall be defined only on the basis of the attached claim and its equivalent replacement.

What is claimed is:

1. A charging adapter for electric vehicle, characterized by comprising:
   a connection mechanism, configured to mechanically connect an electric vehicle and a charging device and to hold a transmission wire for transmitting electrical energy;
   a control board, configured to perform the following actions:
     monitoring a temperature of the charging adapter; and
     controlling a switch-off of a charging current according to a voltage of a detection pin;
   a charging plug, installed at one end of the connection mechanism and connected with the transmission wire, wherein the charging plug is configured to be electrically connected to a charging socket of the electric vehicle, and the charging plug has one or more detection pins which are connected in series with a detection resistance, respectively;
   a charging socket, installed at the other end of the connection mechanism, and configured to be connected with a charging gun;
   a locking pressure plate, installed on a surface of the end of the connecting mechanism near the charging plug, and configured to lock the charging adapter and the charging socket of the electric vehicle; and
   an electromagnet iron, installed inside the connecting mechanism, located under the locking pressure plate and electrically connected with the charging socket of the charging adapter, wherein the electromagnet iron is configured to cooperate with the locking pressure plate to lock the charging adapter with the charging socket of the electric vehicle.

2. The charging adapter according to claim 1, wherein a resistance value of the detection resistance is 1 kΩ.

3. The charging adapter according to claim 1, further comprising a dust cap installed on an outside of the charging socket of the charging adapter.

4. The charging adapter according to claim 1, wherein the charging plug and the charging socket of the charging adapter are designed according to requirements of the national standard GB/T20234.3-2015.

5. The charging adapter according to claim 1, further comprising a temperature sensor, wherein the temperature sensor is installed on the control board, and is configured to detect the temperature inside the charging adapter in real-time.

6. The charging adapter according to claim 1, wherein the locking pressure plate is a warp structure, an end of the locking pressure plate has an unlock button, and a head portion of the locking pressure plate has a buckle.

7. The charging adapter according to claim 6, wherein an iron rod is disposed inside of the electromagnet iron, when the electromagnet iron is energized, the iron rod ejects, and the iron rod is located directly below the unlock button and close to the unlock button.

8. A charging protection method, adapted for the charging adapter according to claim 5 the charging protection method comprising:
   locking the charging adapter and the electric vehicle, comprising:
     after the charging plug of the charging adapter is inserted into the charging socket of the electric vehicle, clamping the locking pressure plate of the charging adapter to the charging socket of the electric vehicle; and
     after charging begins, powering up the electromagnet iron, causing the iron rod inside the electromagnet iron to eject against the locking pressure plate; and
   monitoring temperature, after charging begins, operating the temperature sensor on the control board, to monitor the temperature inside the charging adapter in real-time, once the temperature is above a set threshold, controlling the charging adapter by the control board to interrupt charging.

9. The charging protection method according to claim 8, wherein the set threshold is 60 degrees Celsius.

10. The charging protection method according to claim 8, wherein controlling the charging adapter by the control board to interrupt charging comprising controlling a configuration channel 1 (CC1) pin of the charging socket of the charging adapter to float by the control board, to interrupt the connection signal, and to interrupt electrical conduction.

* * * * *